(12) United States Patent
Bouvet

(10) Patent No.: US 9,973,623 B2
(45) Date of Patent: May 15, 2018

(54) METHODS, DEVICES AND SYSTEM FOR LOGGING CALLS FOR TERMINALS

(71) Applicant: Orange, Paris (FR)

(72) Inventor: Bertrand Bouvet, Perros-Guirec (FR)

(73) Assignee: ORANGE, Paris (FR)

( * ) Notice: Subject to any disclaimer, the term of this patent is extended or adjusted under 35 U.S.C. 154(b) by 0 days. days.

(21) Appl. No.: 14/424,849

(22) PCT Filed: Jul. 16, 2013

(86) PCT No.: PCT/FR2013/051709
§ 371 (c)(1),
(2) Date: Feb. 27, 2015

(87) PCT Pub. No.: WO2014/033378
PCT Pub. Date: Mar. 6, 2014

(65) Prior Publication Data
US 2015/0237198 A1    Aug. 20, 2015

(30) Foreign Application Priority Data

Aug. 29, 2012  (FR) ..................................... 12 58077

(51) Int. Cl.
*H04M 3/22* (2006.01)
*H04M 3/42* (2006.01)
(52) U.S. Cl.
CPC ..... *H04M 3/2218* (2013.01); *H04M 3/42153* (2013.01); *H04M 3/42229* (2013.01)
(58) Field of Classification Search
CPC ........... H04M 3/2218; H04M 3/42229; H04M 3/42153
See application file for complete search history.

(56) References Cited

U.S. PATENT DOCUMENTS

| | | | | |
|---|---|---|---|---|
| 2003/0043992 | A1* | 3/2003 | Wengrovitz | H04M 7/009 379/229 |
| 2008/0137598 | A1* | 6/2008 | Bouvier | H04L 65/1069 370/329 |
| 2009/0097619 | A1* | 4/2009 | Jackson | H04M 3/53341 379/88.17 |

(Continued)

OTHER PUBLICATIONS

International Search Report and Written Opinion dated Oct. 4, 2013 for corresponding International Application No. PCT/FR2013/051709, filed Jul. 16, 2013.
Sipping WG et al., "A Session Initiation Protocol (SIP) Event Package for Registrations; draft-ietf-sipping-reg-event-00.txt", Oct. 28, 2002, vol. sipping, Oct. 28, 2002 (Oct. 28, 2002), XP015003447.

(Continued)

*Primary Examiner* — Albert T Chou
(74) *Attorney, Agent, or Firm* — David D. Brush; Westman, Champlin & Koehler, P.A.

(57) ABSTRACT

A method is provided for notification of an event relating to execution of a procedure for processing a communication session to be supported by a communication device belonging to a set of devices associated with a user. The method includes: reception of a subscription request from a so-called subscriber terminal belonging to the aforementioned set, requesting subscription to an event notification service for at least one so-called event that may occur on a device in the set; reception of information indicating an occurrence of at least one so-called event on a device in the set, other than the subscriber terminal; and sending an event notification to the subscriber terminal, signalling the occurrence.

5 Claims, 5 Drawing Sheets

(56) References Cited

U.S. PATENT DOCUMENTS

Figure 1:
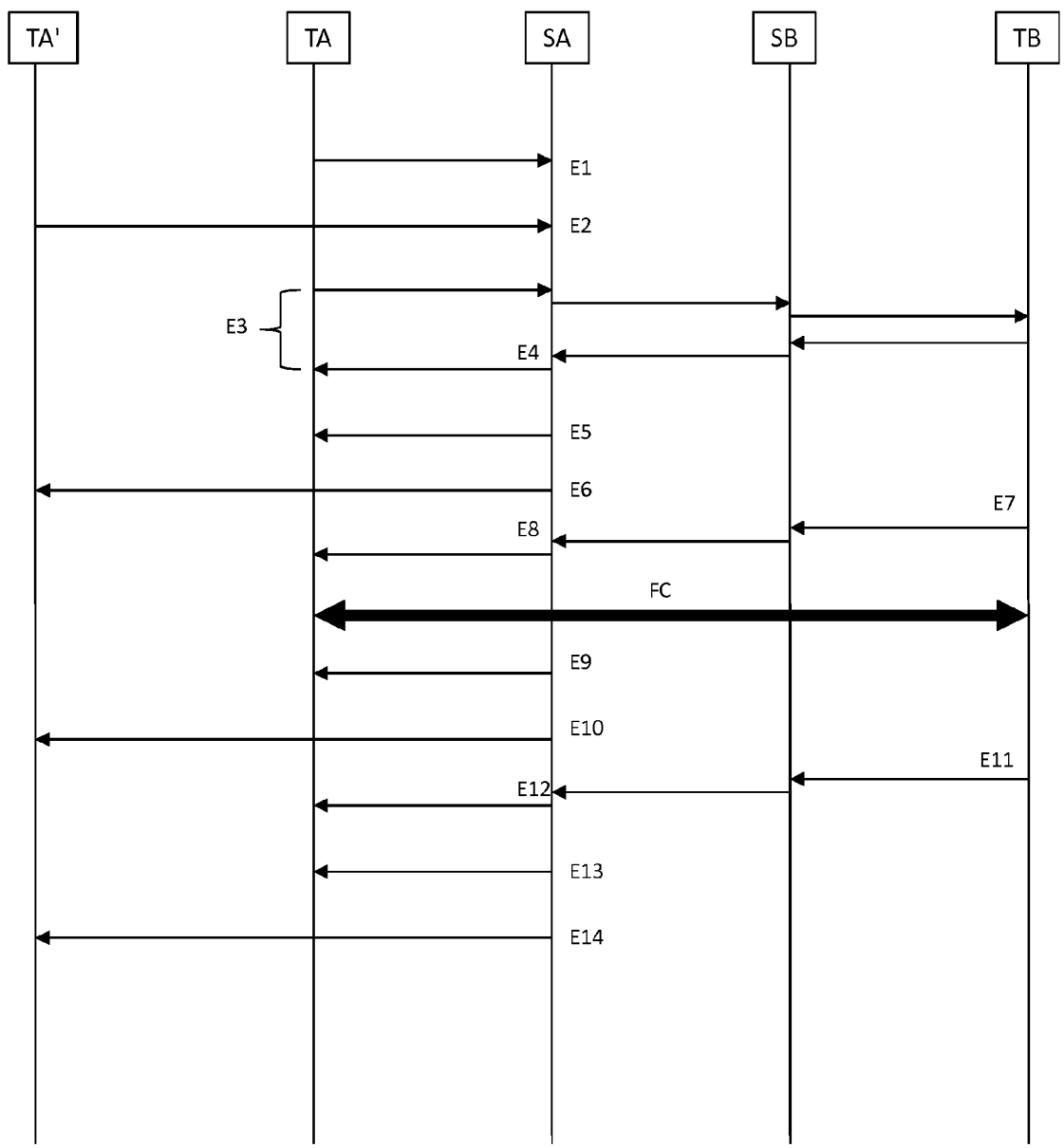

| | | | | |
|---|---|---|---|---|
| 2009/0238358 | A1* | 9/2009 | Ramanathan | H04M 3/42042 379/221.03 |
| 2010/0023624 | A1* | 1/2010 | Long | H04L 65/1016 709/227 |
| 2010/0310062 | A1* | 12/2010 | Srinivasan | H04M 3/42153 379/211.02 |
| 2013/0322312 | A1* | 12/2013 | Kim | H04W 76/04 370/310 |
| 2014/0133399 | A1* | 5/2014 | Kim | H04W 4/14 370/328 |
| 2015/0223054 | A1* | 8/2015 | Zhu | H04L 65/1069 370/328 |

OTHER PUBLICATIONS

Roach et al., "RFC 3265: Session Initial Protocol (SIP)—Specific Event Notification", Networking Working Group Request for Comments, XX, XX, Jun. 1, 2002 (Jun. 1, 2002), pp. 1-38, XP002280672.

French Search Report and Written Opinion dated Jun. 3, 2013 for corresponding French Application No. 1258077, filed Aug. 29, 2012.

English translation of the International Written Opinion dated Jul. 16, 2013 for corresponding International Application No. PCT/FR2013/051709, filed Jul. 16, 2013.

Rosenberg et al., "RFC 3261: A Session Initiation Protocol (SIP)", Networking Working Group, Request for Comments, Jun. 2002 (Jun. 2002), pp. 1-269.

\* cited by examiner

METHODS, DEVICES AND SYSTEM FOR LOGGING CALLS FOR TERMINALS

1. CROSS-REFERENCE TO RELATED APPLICATIONS

This Application is a Section 371 National Stage Application of International Application No. PCT/FR2013/051709, filed Jul. 16, 2013, the content of which is incorporated herein by reference in its entirety, and published as WO 2014/033378 on Mar. 6, 2014, not in English.

2. FIELD OF THE INVENTION

The patent application lies in the field of telecommunications, and more particularly in VoIP network architectures, and more precisely in the field of the management and updating of the call logs of a user's communication terminal.

3. PRIOR ART

Generally, the call logs managed by user terminals are segmented into 3 distinct lists:
calls received,
missed calls,
calls dialed.

The outgoing calls sent by a terminal are filed in the "calls dialed" log, whether or not they connect successfully, and if they connect successfully, this may be on the terminal called, or, subsequent to a diversion, on a third party terminal or on a voice messaging facility.

The incoming calls which connect successfully on the terminal are filed in the "calls received" log, whereas the calls presented on the terminal and which do not connect successfully are filed in the "missed calls" log.

In terms of customer use or experience, when for example the user gets home, he can consult the "missed calls" list and if calls are present in this list, recall the numbers indicated.

Nevertheless, the information contained in these logs is erroneous, incomplete or lacking in several situations.

In an exemplary situation, the called terminal does not answer and the call is diverted to another communication entity which picks up. In this case the terminal receiving the call first will file the call in a "missed calls" log although the call, subsequent to the diversion, ended up being received, and ought to have been filed in a "calls received" log. The information is therefore erroneous.

Moreover, it may be important to distinguish between various types of communication entities to which a call is diverted, so as to enrich the information. When the entity to which the call is diverted is not another terminal of the user called, such as for example his mobile terminal, but his messaging facility, it would be useful to register the fact that the call was taken by a messaging facility in a call log of the terminal that received the call first, which will have filed it in its "missed calls" log, this not being completely false but remaining incomplete.

In an analogous situation, but on the calling side, a call sent by the fixed terminal of a user does not appear in the "calls dialed" log of his mobile terminal, and vice-versa. The information is therefore lacking.

There exist yet other exemplary situations where the information contained in these logs is erroneous, on account of the possibility now offered to users to associate several of their terminals with one and the same call number. This is rendered possible for example by virtue of the "forking" function of the SIP standard (Session Initiation Protocol, defined at the IETF in RFC3261), making it possible to present a call to all the terminals of a user sharing the same public IMPU identifier (Internet protocol Multimedia Public Identity), be it sequentially or simultaneously. Only the terminal directly involved in the call, be it by sending or receiving, updates one of its call logs with this call, and not the other terminals which nevertheless share the same IMPU.

One of the aims of the invention is to remedy drawbacks of the prior art.

4. DISCLOSURE OF THE INVENTION

The invention improves the situation with the aid of a method of event notification relating to the progress of a processing procedure of a communication session intended to be carried by a communication entity of a set of entities associated with a user, comprising:
a step of receiving, originating from a terminal of said set, the so-called subscriber terminal, a request for subscription to an event notification service for at least one said event liable to occur on an entity of said set,
at least one step of receiving an item of information indicative of an occurrence of at least one said event on an entity of said set, distinct from said subscriber terminal,
at least one step of dispatching, to said subscriber terminal, an event notification signaling said occurrence.

Said set of entities, thus defined, is the set of all the entities associated with one and the same user that are liable to send a request to establish a communication session, to receive it, or to take part in the communication session if it is established.

The association of the entities with a user may exist by way of one and the same public terminal identifier, of a common customer number allocated to a messaging facility, or of a call diversion relationship, temporary or not, between a terminal of the user and a terminal of another user.

In a system complying with the SIP standard, the terminals associated with one and the same user and complying with the SIP standard share a common identifier, such as an IMPU identifier. Other non-SIP terminals or other SIP entities can also be included in the set of relevant entities, through an association with the same user, for example by way of a customer identifier, or of a messaging facility server identifier allocated to the user.

The entity for implementing the event notification service, implementing the method, receives information on the progress of the request processing procedure, including the processing of the session if it is established. This allows it to determine the corresponding event or events, which may relate for example to:
the presentation of a call,
pick-up subsequent to call presentation,
the cancellation of the call before pick-up,
hang-up at the end of the call,
the diversion of the call to a messaging facility.

It thus notifies the subscriber terminal of the events even if, although the call pertains to it, these events have not occurred on it, in contradistinction to the prior art where only the events occurring on a terminal are known to the latter and usable for the updating of one of the call logs of this terminal.

When the entity for implementing the event notification service complies with the SIP standard, the request for subscription to the event notification service may be made with the aid of a message of SUBSCRIBE type, and the event notification may be made with the aid of a message of NOTIFY type.

The item of information indicative of an occurrence of an event on an entity may be received in a message of "200 OK" type, whether or not this entity complies with the SIP standard.

It is understood that such an implementation of the method makes it possible for a SIP terminal to be afforded the benefit of the notifications so that it updates one of its call logs, even if the terminal involved in the call does not comply with the SIP standard.

According to one aspect of the invention, the item of information indicative of an occurrence of at least one said event on a said entity comprises an identifier of said entity.

By virtue of this aspect, it is possible to distinguish between various entities and to enrich a notification of an event occurring on this entity.

For example, the entity may be the first of a user's two terminals. When this first terminal accepts an incoming call, its identifier may be included in the "200 OK" message that it sends to the network to indicate that it has accepted the call.

This aspect makes it possible to enrich the "calls received" log of the user's second terminal. Indeed, this second terminal will be able to update its "calls received" log by supplementing it with the item of information that it is the first terminal that has taken part in the call, on condition of course that it has previously subscribed to the event notification service.

According to one aspect of the invention, the item of information indicative of an occurrence of at least one said event on a said entity comprises an item of information relating to the type of said entity.

By virtue of this aspect, it is possible to distinguish between various types of entities and to enrich a notification of an event occurring on this entity.

For example, the entity may be a voice messaging facility. This item of information may be included in the "200 OK" message, with the aid of a label (Tag) indicating that the call has been accepted by an automaton (Tag="Automata"). This message is sent by a SIP messaging facility to the SIP application server to indicate to the latter that the former has accepted the call.

This aspect makes possible the creation of a new type of call log which does not exist according to the prior art. Indeed, the terminal having received the request to establish a communication session and having diverted it to a messaging facility which is associated therewith, will be able to update a "calls diverted to messaging facility" log, on condition of course that it has previously subscribed to the event notification service.

According to one aspect of the invention, when said event is indicative of the end of said processing procedure, the event notification comprises an item of information relating to the end of the subscription to the event notification service, and the step of dispatching the notification is followed by a step of ending said subscription to the event notification service.

According to this aspect, the subscription to the notification service ends with the ending of the call. The subscription is therefore valid for a single call, the advantage of which is to limit the number and duration of the subscriptions to be managed at a given instant, and decreases the costs in terms of necessary calculation power and memory size (saving of the subscription contexts).

The various aspects of the method which has just been described can be implemented independently of one another or in combination with one another.

The invention also relates to a method of call log updating, implemented by a communication entity of a set of entities associated with a user, the so-called subscriber terminal, comprising:
  a step of sending a request for subscription to an event notification service for at least one event relating to the progress of a processing procedure of a communication session, and liable to occur on an entity of said set,
  at least one step of receiving an event notification signaling an occurrence of at least one said event on a said entity, distinct from the subscriber terminal,
  at least one step of determining, as a function of the event notification received, whether the at least one said event is indicative of the end of said processing procedure,
and, when the at least one said event is indicative of the end of said processing procedure:
  a step of selecting a call log as a function of the at least one notification received,
  a step of updating the call log selected as a function of the at least one notification received.

For a request to establish a communication session relating to several terminals, the subscriber terminal can update the right call log on the basis of events relating to the progress of the request, including the progress of the session if it is established, by virtue of the notifications received, even if these events have not occurred on the subscriber terminal, in contradistinction to the prior art where a terminal is cognizant solely of the events occurring on itself.

For example, if a user A has two terminals TA and TA', and makes an outgoing call from TA', the "calls dialed" log of the terminal TA, the subscriber, will be updated correctly, in contradistinction to the prior art where only the "calls dialed" log of TA' is updated.

Likewise, for example, if a user B has two terminals TB and TB', and accepts an incoming call on TB', the "calls received" log of the terminal TB, the subscriber, will be updated correctly, in contradistinction to the prior art where either no log of TB is updated, or it is the "missed calls" log of TB which is updated if the incoming call has been exhibited to both terminals TB and TB'.

In another example, if the users A and B configure a diversion of calls from a terminal TA of A to a terminal TB of B, typically to ensure a continuous skeleton service while the user A is on leave, the "calls received" log of the terminal TA will be updated when a call diverted to the terminal TB is accepted, on condition of course that the terminal TA has previously subscribed to the event notification service. In the prior art, on the contrary, it is not possible to update a call log of the terminal TA on the basis of an event occurring on the terminal TB of another user, even when a diversion relationship exists between the two terminals.

Furthermore, the updating of the call logs on the basis of information generated by the network, rather than generated locally by the terminal as in the prior art, makes it possible to avoid legal disputes between users and providers of telecommunication services. For example, the duration of the calls cannot be contested, the measurement of call duration now being carried out by the network rather than by the terminal.

In an implementation where the subscriber terminal is a terminal complying with the SIP standard, the sending of a subscription request may be done with the aid of a message of SUBSCRIBE type, and the reception of a notification may be done with the aid of a message of NOTIFY type. The end of the processing procedure of a communication session is indicated, for example, by a "Call release" NOTIFY message corresponding to a normal end of session, or by a "Call abandoned" NOTIFY message corresponding to an abandoning of the request before the establishment of the session. The end of the processing procedure can also be indicated by an item of information relating to the end of the subscription to the event notification service, "End of Subscription", included in the NOTIFY message.

According to one aspect of the invention, the step of sending a subscription request is triggered by the reception of a request to establish a communication session.

By virtue of this aspect, the subscription to the event notification service is performed by a terminal on presentation of the call solely. It is therefore not necessary for the subscription to be performed in advance in anticipation of one or more calls. Preventing in this way a subscription from being triggered without a call being associated with it has the advantage of limiting the number and duration of the subscriptions to be managed at a given instant, and decreases the costs in terms of necessary calculation power and memory size in the network entity responsible for subscriptions.

The invention also relates to a device for event notification relating to the progress of a processing procedure of a communication session intended to be carried by a communication entity of a set of entities associated with a user, comprising:
  a module for receiving, originating from a terminal of said set, the so-called subscriber terminal, a request for subscription to an event notification service for at least one said event liable to occur on an entity of said set,
  a module for receiving an item of information indicative of an occurrence of at least one said event on an entity of said set, distinct from said subscriber terminal,
  a module for dispatching, to said subscriber terminal, an event notification signaling said occurrence.

This device can be implemented in an entity of the network in charge of the processing of the request to establish a communication session, of the management of the signaling related to the request, or of the transport of the data of the communication session. In an implementation of the invention according to the SIP standard, this entity may be an SIP application server.

The invention also relates to a device for call log updating, implemented by a communication entity of a set of entities associated with a user, the so-called subscriber terminal, comprising:
  a module for sending a request for subscription to an event notification service for at least one event relating to the progress of a processing procedure of a communication session, and liable to occur on an entity of said set,
  a module for receiving an event notification signaling an occurrence of at least one said event on a said entity, distinct from the subscriber terminal,
  a module for determining, as a function of the event notification received, whether the at least one said event is indicative of the end of said processing procedure,
  a module for selecting a call log as a function of the at least one notification received,
  a module for updating the call log selected as a function of the at least one notification received.

The invention also relates to an application server of a communications network comprising an event notification device such as described above.

Such an application server is for example a SIP application server. This may be either the one implementing the so-called "originating" SIP telephone services, on the calling terminal side of the network, or the one implementing the so-called "terminating" SIP telephone services, on the called terminal side of the network, or some other SIP application server, possibly dedicated to the management of subscriptions to event notifications.

The invention also relates to a terminal connected to a communications network, comprising a call log updating device such as described above.

Such a terminal is for example a telephone apparatus or videophone apparatus furnished with user consultable call logs, and which may or may not comply with the SIP standard.

The invention also relates to a system for managing call logs, comprising at least one application server such as described above and at least one terminal such as described above.

Such a system comprises for example one or more SIP application servers and SIP terminals.

The invention also relates to a computer program, comprising instructions for the implementation of the steps of the method of event notification such as described above, when this method is executed by a processor.

The invention also relates to a recording medium for the program which has just been described, readable by computer, that can use any programming language, and be in the form of source code, object code, or of code intermediate between source code and object code, such as in a partially compiled form, or in any other desirable form.

The invention also relates to a computer program, comprising instructions for the implementation of the steps of the method of call log updating such as described above, when this method is executed by a processor.

The invention also relates to a recording medium for the program which has just been described, readable by computer, that can use any programming language, and be in the form of source code, object code, or of code intermediate between source code and object code, such as in a partially compiled form, or in any other desirable form.

5. PRESENTATION OF THE FIGURES

Figure 2:
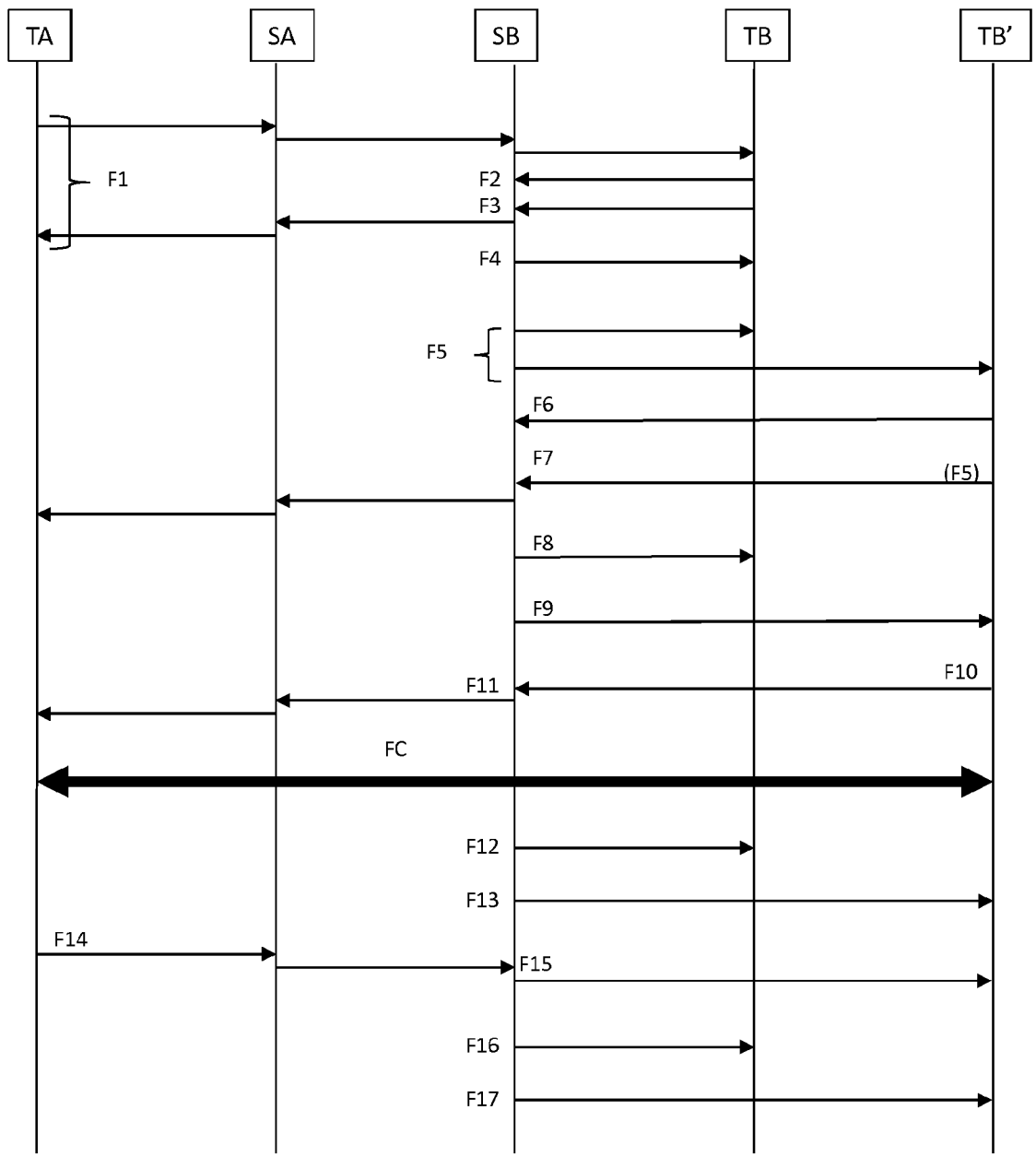
Figure 3:
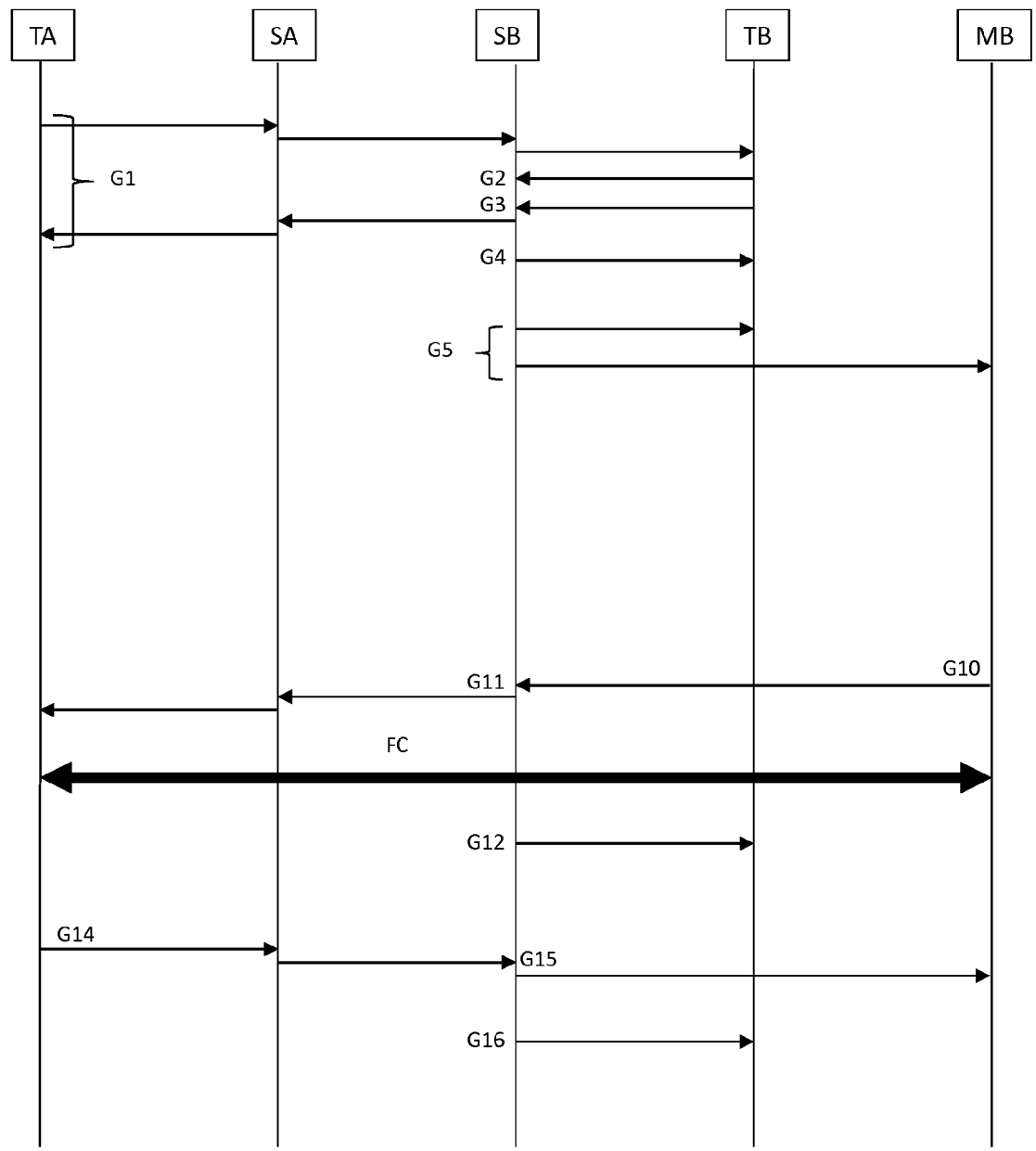
Figure 4:
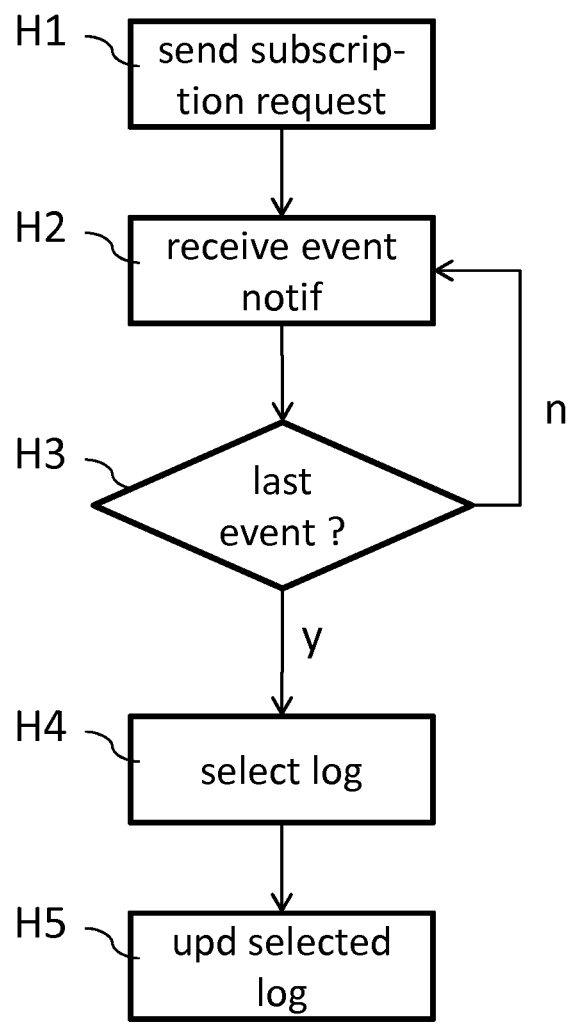
Figure 5:
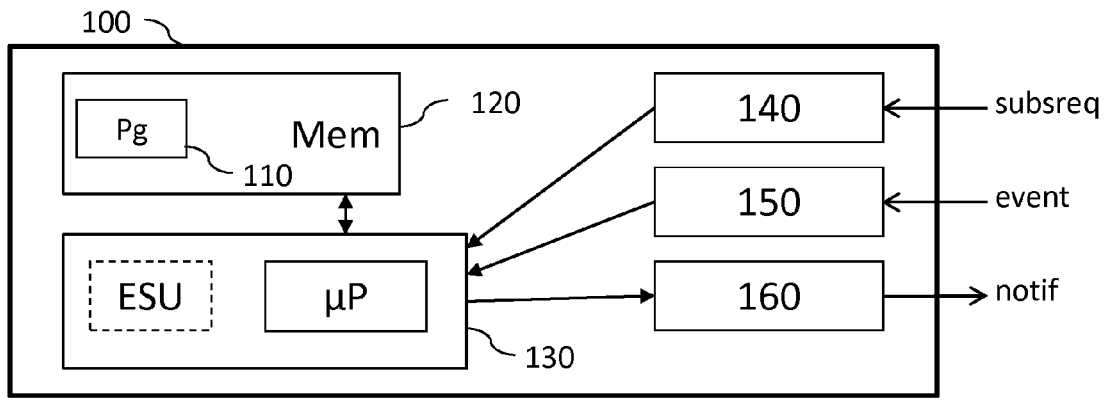
Figure 6:
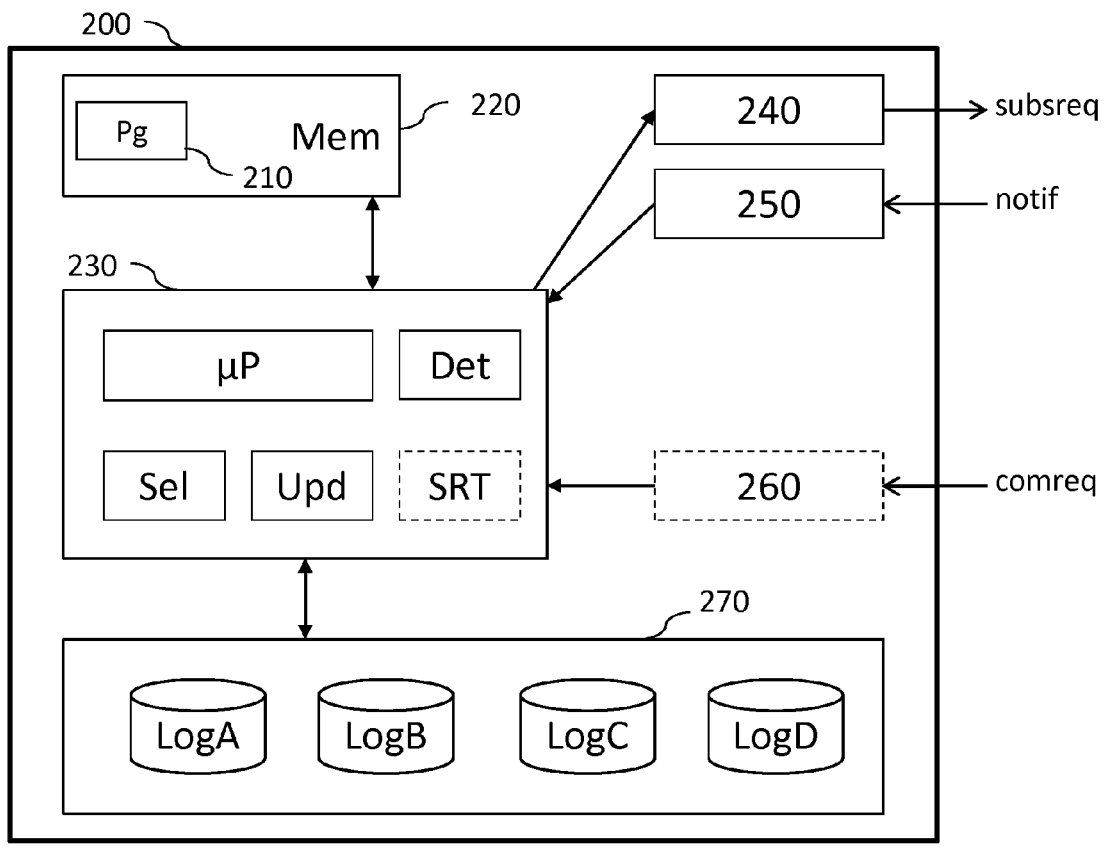

Other advantages and characteristics of the invention will become more clearly apparent on reading the following description of a particular embodiment, given by way of simple illustrative and non-limiting example, of the invention and of the appended drawings, among which:

FIG. 1 presents an exemplary implementation of the method of event notification, according to a first embodiment of the invention, when the user with whom the terminals of the set are associated is the calling user, FIG. 2 presents an exemplary implementation of the method of event notification, according to a second embodiment of the invention, when the user with whom the terminals of the set are associated is the called user, FIG. 3 presents an exemplary implementation of the method of event notification, according to another embodiment of the invention, when the user with whom the terminals of the set are associated is the called user, FIG. 4 presents an exemplary implementation of the method of call log updating according to the invention, FIG. 5 presents an exemplary structure of an event notification device, according to an aspect of the invention, FIG. 6 presents an exemplary structure of a call log updating device, according to an aspect of the invention.

6. DETAILED DESCRIPTION OF AT LEAST ONE EMBODIMENT OF THE INVENTION

In the subsequent description, the case is considered of embodiments wherein the invention is carried out by network entities and user terminals complying with the SIP standard. The invention is not limited to this case, and applies to other standards, such as H.323 (set of voice, image and data over IP communication protocols, developed by the ITU-T), or CAT-Iq (communication protocol between a base and wireless terminals, developed by the DECT Forum).

The context of the invention is the progress of a processing procedure of a communication session intended to be carried by a communication entity of a set of entities associated with a user.

The expression "processing procedure of a communication session" should be understood as meaning the complete processing procedure, including the processing of the session establishment request, and, if it is established, the processing of the session per se and the processing of its end.

The expression "set of entities associated with a user" should be understood as meaning a set, previously constituted or not, of entities sharing for example a common identifier (same IMPU identifier according to the SIP standard, or same customer number associated with the entity) and/or sharing a tie such as a call diversion, configured for an arbitrary duration, between two call numbers.

In the context of SIP communication sessions, a "call request" is synonymous with "session establishment request".

FIG. 1 presents an exemplary implementation of the method of event notification, according to a first embodiment of the invention, when the user with whom the terminals of the set are associated is the calling user.

In this example, user A seeks to call user B. The set of relevant entities according to the invention comprises the terminals TA and TA', associated with user A. The terminal TB is associated with user B and does not form part of the set. The terminals TA and TA' dialog with a network entity SA implementing the method. The terminal TB dialogs with a network entity SB, itself dialoging with the entity SA.

During a step E1, SA receives from TA a request for subscription to an event notification service.

During a step E2, SA receives from TA' a request for subscription to an event notification service. The message received during step E2 is similar to that of step E1.

The messages received during steps E1 and E2 may be manifested in the form of a message of type "SUBSCRIBE (Event package=Call Log)" according to a modification of the SIP standard, reception of which is acknowledged by a message of "200 OK" type, not represented in the figure, according to the SIP standard. A modified SUBSCRIBE message such as this comprises for example the following parameters:
  the "Request URI" parameter which contains the telephone number of the terminal as well as the domain name of the service corresponding to the Event Package Call Log,
  the "To" parameter identical to the Request URI parameter,
  the "From" parameter which contains the telephone Number of the terminal and its SIP domain name,
  the "Event" parameter which contains the name of the "Call Log" service,
  the "Contact" parameter which contains the reachability address of the terminal TA.

Subsequent to the dispatching of the "200 OK" acknowledgment message by the entity SA to the terminal TA, the server SA dispatches a notification message to the terminal TA, not represented in the figure, informing it that no call is in progress. This message is acknowledged by the terminal TA via a "200 OK", not represented in the figure. The same holds for the terminal TA'. During a call step E3, known and independent of the method, TA sends TB a request to establish a communication session. This request is relayed successively by SA and SB before being received by TB and may initially be manifested in the form of a message of type "INVITE (From=A, RURI=B, To=B)" according to the SIP standard. In response, TB sends TA a message of "180 Ringing" type relayed successively by SB and SA, indicating that the call has been presented to TB and is on hold awaiting a pick-up.

During a step E4, the "180 Ringing" message is therefore received by SA. SA detects that this message is an item of information indicative of an occurrence of an event affecting TA, the event being the arrival on TB of the call request from TA.

During a step E5, SA sends TA a notification corresponding to the event of step E4.

During a step E6, SA sends TA' a notification corresponding to the event of step E4. The message sent during step E6 is identical to that of step E5.

The messages sent during steps E5 and E6 may be manifested in the form of a message of type "NOTIFY (outgoing call in progress—Date Time)" according to an upgrade of the SIP standard, the reception of which may be acknowledged by a message of "200 OK" type, not represented in the figure, according to the SIP standard. A modified NOTIFY message such as this comprises for example the following parameters:
  the "request URI" parameter which is enabled with the contact address of the terminal,
  the "To" parameter which contains the public address of the terminal TA,
  the "From" parameter which contains the public address of the "Call Log" service managed by the entity SA,
  parameters related to the "event package" "Call Log" of the type "Outgoing Call in Progress", "date", "time", "remote party number".

During a call pick-up step E7, known and independent of the method, TB sends TA a positive response to its request to establish a communication session. This response is relayed successively by SB and SA before being received by TA and may be manifested in the form of a message of "200 OK" type according to the SIP standard, indicating that the call has been accepted by TB. The session FC between TA and TB is established subsequent to this step.

During a step E8, the "200 OK" message is therefore received by SA. SA detects that this message is an item of information indicative of an occurrence of an event affecting TA, the event being the acceptance (stated otherwise the "picking up") by TB of the call request of TA.

During a step E9, SA sends TA a notification corresponding to the event of step E8.

During a step E10, SA sends TA' a notification corresponding to the event of step E8. The message sent during step E10 is identical to that of step E9.

The messages sent during steps E9 and E10 may for example be manifested in the form of a message of type "NOTIFY (call accepted—Live Call—Media=visio—Date Time)" according to a modification of the SIP standard (refer to step E5), the reception of which may be acknowledged by a message of "200 OK" type, not represented in the figure, according to the SIP standard.

During an end-of-call step E11, known and independent of the method, TB hangs up, this being manifested by the sending to TA of an end-of-communication session message, relayed successively by SB and SA, that may be manifested in the form of a message of "BYE" type according to the SIP standard, indicating that the call has been ended.

During a step E12, the "BYE" message is therefore received by SA. SA detects that this message is an item of information indicative of an occurrence of an event affecting TA, the event being the end of the call (stated otherwise "hanging up") by one of the terminals TB or TA.

During a step E13, SA sends TA a notification corresponding to the event of step E12.

During a step E14, SA sends TA' a notification corresponding to the event of step E12. The message sent during step E14 is identical to that of step E13.

The messages sent during steps E13 and E14 may for example be manifested in the form of a message of type "NOTIFY (call release—Duration)" according to an upgrade of the SIP standard (refer to step E5), the reception of which may be acknowledged by a message of "200 OK" type, not represented in the figure, according to the SIP standard.

During steps described in conjunction with the method of call log updating illustrated in FIG. 4, the terminal TA' selects its "calls dialed" log and updates it, on the basis of the notifications received subsequent to steps E6, E10 and E14.

Similarly, the terminal TA selects its "calls dialed" log and updates it, on the basis of the notifications received subsequent to steps E5, E9 and E13.

It is understood that by virtue of the method of event notification, the terminal TA', although not having participated in the session FC, is capable of selecting the right call log from among its call logs, and of correctly updating it with relevant information such as the number called and the duration of the call, in contradistinction to the prior art where none of its call logs is updated.

FIG. 2 presents an exemplary implementation of the method of event notification, according to a second embodiment of the invention, when the user with whom the terminals of the set are associated is the called user.

In this example, user A seeks to call user B. The set of relevant entities according to the invention comprises the terminals TB and TB', associated with user B. According to a known technique, the user has configured his terminals in such a way that a call request is directed by priority to TB, and in such a way that the request is diverted from TB to TB' when TB does not pick up before expiry of a determined interlude DD. The terminal TA is associated with user A and does not form part of the set. The terminals TB and TB' dialog with a network entity SB implementing the method. The terminal TA dialogs with a network entity SA, itself dialoging with the entity SB.

During a call step F1, known and independent of the method, TA sends TB a request to establish a communication session. This request is relayed successively by SA and SB before being received by TB and may initially be manifested in the form of a message of type "INVITE (From=A, RURI=B, To=B)" according to the SIP standard. In response, TB sends TA a message of "180 Ringing" type relayed successively by SB and SA, indicating that the call has been presented to TB and is on hold awaiting a pick-up.

During a step F2, SB receives from TB a request for subscription to an event notification service. It is the reception of the call request by TB subsequent to step F1 that triggers the sending by TB of this request.

The message received during step F2 may for example be manifested in the form of a message of type "SUBSCRIBE (Event package=Call Log)" according to an upgrade of the SIP standard (refer to step E1), the reception of which may be acknowledged by a message of "200 OK" type, not represented in the figure, according to the SIP standard.

During a step F3, the "180 Ringing" message subsequent to the request to establish a communication session of step F1 is received by SB. SB detects that this message is an item of information indicative of an occurrence of an event affecting TB, the event being the arrival on TB of the call request from TA.

During a step F4, SB sends TB a notification corresponding to the event of step F3.

The message sent during step F4 may for example be manifested in the form of a message of type "NOTIFY (call presentation)" according to an upgrade of the SIP standard (refer to step E5), the reception of which may be acknowledged by a message of "200 OK" type, not represented in the figure, according to the SIP standard.

During a call diversion step F5, known and independent of the method, subsequent to expiry of the determined interlude DD, SB sends TB a cancellation of the request to establish a communication session. This message may be manifested in the form of a message of "CANCEL" type according to the SIP standard, the reception of which may be acknowledged by a message of "200 OK" type, not represented in the figure, according to the SIP standard. Still during this step F5, SB thereafter sends TB' a request to establish a communication session. This request may be manifested in the form of a message of type "INVITE (From=A, RURI=AoC TB', To=B)" according to the SIP standard. In response, TB' sends TA a message of "180 Ringing" type relayed successively by SB and SA, indicating that the call has been presented to TB' and is on hold awaiting a pick-up.

During a step F6, SB receives from TB' a request for subscription to an event notification service. It is the reception of the call request by TB' subsequent to step F5 that triggers the sending by TB' of this request.

The message received during step F6 may for example be manifested in the form of a message of type "SUBSCRIBE (Event package=Call Log)" according to an upgrade of the SIP standard (refer to step E1), the reception of which may be acknowledged by a message of "200 OK" type, not represented in the figure, according to the SIP standard.

During a step F7, the "180 Ringing" message subsequent to the request to establish a communication session of step F5 is received by SB. SB detects that this message is an item of information indicative of an occurrence of an event affecting TB', the event being the arrival on TB' of the call request of TA.

During an optional step F8, SB sends TB a notification corresponding to the event of step F7. This step is optional since in general the item of information transported by this notification is rendered obsolete subsequently, unless TB possesses a call log dedicated to the calls presented to other terminals.

During a step F9, SB sends TB' a notification corresponding to the event of step F7.

The messages sent during steps F8 and F9 may for example be manifested in the form of a message of type "NOTIFY (call presentation)" according to an upgrade of the SIP standard (refer to step E5), the reception of which may be acknowledged by a message of "200 OK" type, not represented in the figure, according to the SIP standard.

During a call pick-up step F10, known and independent of the method, TB' sends TA a positive response to its request to establish a communication session. This response is relayed successively by SB and SA before being received by TA and may be manifested in the form of a message of "200 OK" type according to the SIP standard, indicating that the call has been accepted by TB'. The session FC between TA and TB is established subsequent to this step.

During a step F11, the "200 OK" message is therefore received by SB. SB detects that this message is an item of information indicative of an occurrence of an event affecting TB', the event being the acceptance (stated otherwise the "picking up") by TB' of the call request of TA.

During a step F12, SB sends TB a notification corresponding to the event of step F11.

During a step F13, SB sends TB' a notification corresponding to the event of step F11. The message sent during step F13 is identical to that of step F12.

The messages sent during steps F12 and F13 may for example be manifested in the form of a message of type "NOTIFY (call accepted—Live Call—Media=standard voice—Date Time)" according to an upgrade of the SIP standard (refer to step E5), the reception of which may be acknowledged by a message of "200 OK" type, not represented in the figure, according to the SIP standard.

During an end-of-call step F14, known and independent of the method, TA hangs up, this being manifested by the sending to TB of an end-of-communication session message, relayed successively by SA and SB, which may be manifested in the form of a message of "BYE" type according to the SIP standard, indicating that the call has been ended.

During a step F15, the "BYE" message is therefore received by SB. SB detects that this message is an item of information indicative of an occurrence of an event affecting TB', the event being the end of the call (stated otherwise "hanging up") by one of the terminals TA or TB'.

During a step F16, SB sends TB a notification corresponding to the event of step F15.

During a step F17, SB sends TB' a notification corresponding to the event of step F15. The message sent during step F17 is identical to that of step F16.

The messages sent during steps F16 and F17 may for example be manifested in the form of a message of type "NOTIFY (call release—Duration)" according to an upgrade of the SIP standard (refer to step E5), the reception of which may be acknowledged by a message of "200 OK" type, not represented in the figure, according to the SIP standard.

During steps described in conjunction with the method of call log updating illustrated in FIG. 4, the terminal TB selects its "calls received" log and updates it, on the basis of the notifications received subsequent to steps F4, F12 and F16.

Similarly, the terminal TB' selects its "calls received" log and updates it, on the basis of the notifications received subsequent to steps F9, F13 and F17.

It is understood that by virtue of the method of event notification, the terminal TB, although not having participated in the session FC, is capable of selecting the right call log from among its call logs, and of correctly updating it with relevant information such as the calling number and the duration of the call, in contradistinction to the prior art, where it would erroneously have selected its "missed calls" log.

In a third embodiment, in conjunction with FIG. 2, the item of information received during step F11 comprises an identifier of TB'. Step F12 and step F13 are replaced respectively with a step F12' and a step F13', neither illustrated, where the notification sent comprises this identifier of TB', in addition to the elements transmitted during step F12 and step F13, respectively.

Advantageously, it is thus possible to enrich the updating of the "calls received" log of TB with an item of information indicating that it is the terminal TB' which has participated in the session FC, and not the terminal TB.

FIG. 3 presents an exemplary implementation of the method of event notification, according to a fourth embodiment of the invention, when the user with whom the terminals of the set are associated is the called user.

In this example, user A seeks to call user B. The set of relevant entities according to the invention comprises the terminal TB and the messaging entity MB, both associated with user B. According to a known technique, the user has configured his terminals in such a way that a call request to TB is diverted from TB to his voice messaging facility MB when TB does not pick up before expiry of a determined interlude DD. The terminal TA is associated with user A and does not form part of the set. The terminal TB and the entity MB dialog with a network entity SB implementing the method. The terminal TA dialogs with a network entity SA, itself dialoging with the entity SB.

Steps G1 to G5 are identical respectively to steps F1 to F5 described in conjunction with FIG. 2.

During a step G10 following on from step G5, the response sent by the messaging facility MB subsequent to the acceptance of the call by the latter includes an item of information relating to the type of entity, namely the messaging facility MB. According to a known technique, this response may be manifested in the form of an SIP message of "200 OK" type comprising a label "Tag=Automata".

During a step G11, the "200 OK" message is therefore received by SB. SB detects that this message is an item of information indicative of an occurrence of an event affecting MB, the event being the acceptance (stated otherwise the "picking up") by MB of the call request of TA.

During a step G12, SB sends TB a notification corresponding to the event of step G11. The message sent during this step G12 may for example be manifested in the form of a message of type "NOTIFY (call accepted—Voice Mail—Media=HD voice—Date Time)" according to an upgrade of the SIP standard (refer to step E5), the reception of which may be acknowledged by a message of "200 OK" type, not represented in the figure, according to the SIP standard.

The following steps, G14, G15 and G16, are identical respectively to steps F14, F15 and F16 described in conjunction with FIG. 2.

During steps described in conjunction with the method of call log updating illustrated in FIG. 4, the terminal TB selects its "calls diverted to messaging facility" log and updates it, on the basis of the notifications received subsequent to steps G4, G12 and G16.

It is understood that, by virtue of the method of event notification, the terminal TB, although not having participated in the session FC, is capable of correctly selecting the "calls diverted to messaging facility" log from among its call logs, and of correctly updating it with relevant information such as the calling number and the duration of the message left, in contradistinction to the prior art, where it would erroneously have selected its "missed calls" log.

In a fifth embodiment, in conjunction with FIG. 3, the entity implementing the method of event notification deduces from the item of information received during step G15 ("BYE", signifying a hanging up of the terminal TA or of the messaging facility MB involved in the call) that the call processing procedure has terminated.

In a step G16', not illustrated, replacing step G16, the notification sent comprises, in addition to the elements transmitted during step G16, an item of information relating to the end of the subscription. The message sent during this step G16' may for example be manifested in the form of a message of type "NOTIFY (call release—Duration—End of subscription)" according to an upgrade of the SIP standard.

In a step G17', not illustrated, parallel with or following on from step G16', the subscription requested during step G2 is ended.

Advantageously, the entity implementing the method of event notification is not compelled to store the subscription once the call has been terminated, and the terminal that requested the subscription knows that it will have to renew its request as a function of its needs. This makes it possible in particular to optimize the memory resources of the entity implementing the method.

The embodiments which have just been described can be combined in diverse ways.

FIG. 4 presents an exemplary implementation of the method of call log updating according to the invention.

The steps are implemented by a terminal concerned with a request to establish a communication session, the so-called subscriber terminal.

During a step H1, the subscriber terminal sends a request for subscription to an event notification service for at least one event relating to the progress of a processing procedure in respect of this request to establish a communication session liable to occur on an entity of a set of entities associated with one and the same user concerned with the request.

The message sent during step H1 may be manifested in the form of a message of type "SUBSCRIBE (Event package=Call Log)" according to an upgrade of the SIP standard (refer to step E1).

During a step H2, the terminal receives an event notification signaling an occurrence of an event on one of the entities of the set, and stores the content thereof.

The message received during step H2 may be manifested in the form of a message of type "NOTIFY (parameter 1, parameter 2, etc)" according to an upgrade of the SIP standard (refer to step E5).

During a step H3, the terminal determines, as a function of the notification received, whether the signaled event is indicative of the end of the processing procedure. If one of the parameters included in the "NOTIFY" message is for example "Call release" or "Call abandoned", this signifies respectively that the established call has been terminated, or that the call request has been abandoned before establishment. These parameters are indicative of the end of the processing procedure.

In one of the embodiments of the notification method, described above, one of the parameters included in the "NOTIFY" message can also be "End of subscription". This signifies that the subscriber terminal will no longer receive any other notification relating to this call, and this parameter is therefore also considered to be indicative of the end of the processing procedure.

If, on completion of step H3, it is not determined that the end of the processing procedure is reached, the method returns to step H2.

Otherwise it goes to a step H4. During step H4, the subscriber terminal selects one of its call logs as a function of the stored content of the notification or notifications received.

It is the "calls dialed" log if for example some "NOTIFY" messages comprise "Outgoing call in progress" and "Call release".

It is the "calls received" log if for example some "NOTIFY" messages comprise "Call presentation" and "Call release".

It is the "missed calls" log if for example a "NOTIFY" message comprises "Call presentation" and no "NOTIFY" message comprises "Call accepted".

It is the "calls abandoned" log if for example a "NOTIFY" message comprises "Call abandoned".

It is the "calls diverted to messaging facility" log if for example a "NOTIFY" message comprises "Automata".

During a step H5 following on from step H4, the terminal updates the log selected with the aid of the stored content of the notification or notifications received.

In conjunction with FIG. 5, an exemplary structure of an event notification device is now presented according to an aspect of the invention.

The event notification device 100 implements the method of event notification such as described hereinabove.

Such a device 100 can be integrated into an SIP application server, such as the origin SIP telephone application server, on the calling side, or the destination SIP telephone application server, on the called side, depending on whether the set of entities relevant to the method is a set of entities associated respectively with a calling or called user. The device 100 can also be implemented in an SIP application server distinct from the origin or destination SIP telephone application servers, in an entity of the network possibly dedicated to event notification.

For example, the device 100 comprises a processing unit 130, equipped for example with a microprocessor µP, and driven by a computer program 110 stored in a memory 120 and implementing the method of event notification according to the invention. On initialization, the code instructions of the computer program 110 are for example loaded into a RAM memory, before being executed by the processor of the processing unit 130.

Such a device 100 comprises:
- a reception module 140, able to receive a request for subscription to an event notification service (subsreq) for at least one event relating to the progress of a processing procedure of a communication session, originating from a subscriber terminal,
- a reception module 150, able to receive an item of information indicative of an occurrence of at least one event,
- a dispatching module 160, able to dispatch an event notification (notif), signaling the occurrence, to the subscriber terminal.

Advantageously, the processing unit 130 can comprise:
- an end-of-subscription unit ESU, able to end the subscription when the item of information indicative of an occurrence of at least one event is indicative of the end of the processing procedure.

In conjunction with FIG. 6, an exemplary structure of a call log updating device is now presented according to an aspect of the invention.

The call log updating device 200 implements the method of call log updating such as described hereinabove.

Such a device 200 can be integrated into a mobile or fixed communication terminal, for example complying with the SIP standard, usable by a physical person.

For example, the device 200 comprises a processing unit 230, equipped for example with a microprocessor µP, and driven by a computer program 210 stored in a memory 220 and implementing the method of call log updating according to the invention. On initialization, the code instructions of the computer program 210 are for example loaded into a RAM memory, before being executed by the processor of the processing unit 230.

Such a device 200 comprises:
- a sending module 240, able to send a request for subscription to an event notification service (subsreq) for at least one event relating to the progress of a processing procedure of a communication session,
- a reception module 250, able to receive an event notification (notif) signaling the occurrence of at least one event.

Advantageously, such a device 200 can comprise furthermore:
- a reception module 260, able to receive a request to establish a communication session (comreq).

The processing unit 230 comprises:
- a determination unit Det, able to determine the end of the processing procedure of a communication session,
- a selection unit Sel, able to select a call log (Log A, Log B, Log C, Log D), from among a group of call logs 270, as a function of one or more events,
- an updating unit Upd, able to update the call log selected as a function of one or more events.

For example, Log A is the "calls dialed" log, Log B is the "calls received" log, Log C is the "calls diverted to messaging facility" log, and Log D is the "calls abandoned" log.

Advantageously, the processing unit 230 can comprise furthermore:
- a subscription triggering unit SRT, able to trigger the sending of a subscription request on receipt of a request to establish a communication session.

The modules and units described in conjunction with FIGS. 5 and 6 can be hardware or software modules or units.

The exemplary embodiments of the invention which have just been presented are merely a few of the conceivable embodiments. They show that the invention makes it possible to update with enriched information the right call logs of terminals even when the latter have not participated directly in the call. Furthermore, the enrichment of the call logs on the basis of information generated by the network makes it possible to avoid the legal disputes between users and providers of telecommunication services. For example, the duration of the calls cannot be contested, the measurement of call duration being carried out by the network rather than by the terminal.

The invention claimed is:

1. A method of call log updating, implemented by a communication entity of a set of entities associated with a user, called a subscriber terminal, wherein the method comprises:
   sending a request for subscription to an event notification service for at least one event relating to progress of a processing procedure of a communication session, and liable to occur on an entity of said set,
   receiving an event notification signaling an occurrence of at least one said event on an entity of said set, distinct from the subscriber terminal,
   determining, as a function of the event notification received, whether the at least one said event is indicative of an end of said processing procedure,
   and, when the at least one said event is indicative of the end of said processing procedure:
      selecting a call log as a function of the at least one notification received,
      updating the call log selected as a function of the at least one notification received.

2. The method of call log updating, as claimed in claim 1, wherein sending a subscription request is triggered by the reception of a request to establish a communication session.

3. The method of call log updating, as claimed in claim 1, wherein:
   the entities of the set share a common identifier; and
   the request comprises the common identifier.

4. A device for call log updating, implemented by a communication entity of a set of entities associated with a user, called a subscriber terminal, wherein the device comprises:
   a module configured to send a request for subscription to an event notification service for at least one event relating to progress of a processing procedure of a communication session, and liable to occur on an entity of said set,
   a module configured to receive an event notification signaling an occurrence of at least one said event on an entity of said set, distinct from the subscriber terminal,
   a module configured to determine, as a function of the event notification received, whether the at least one said event is indicative of an end of said processing procedure,
   a module configured to select a call log as a function of the at least one notification received,
   a module configured to update the call log selected as a function of the at least one notification received.

5. The device as claimed in claim 4, wherein:
   the entities of the set share a common identifier; and
   the request comprises the common identifier.

* * * * *